(12) United States Patent
Hatahori et al.

(10) Patent No.: US 11,982,641 B2
(45) Date of Patent: May 14, 2024

(54) METHOD AND DEVICE FOR EXAMINING CLINCHED PORTION OF TUBULAR BODY

(71) Applicants: Shimadzu Corporation, Kyoto (JP); Kobe Steel, Ltd., Kobe (JP)

(72) Inventors: Takahide Hatahori, Kyoto (JP); Kenji Takubo, Kyoto (JP); Koki Yoshida, Kyoto (JP); Yoshihaya Imamura, Fujisawa (JP)

(73) Assignees: SHIMADZU CORPORATION, Kyoto (JP); Kobe Steel, Ltd., Kobe (JP)

( * ) Notice: Subject to any disclaimer, the term of this patent is extended or adjusted under 35 U.S.C. 154(b) by 387 days.

(21) Appl. No.: 17/614,527

(22) PCT Filed: Apr. 13, 2020

(86) PCT No.: PCT/JP2020/016301
§ 371 (c)(1),
(2) Date: Nov. 28, 2021

(87) PCT Pub. No.: WO2020/241092
PCT Pub. Date: Dec. 3, 2020

(65) Prior Publication Data
US 2022/0229020 A1      Jul. 21, 2022

(30) Foreign Application Priority Data
May 30, 2019 (JP) .................................. 2019-101741

(51) Int. Cl.
*G01N 29/04*     (2006.01)
*G01N 29/24*     (2006.01)

(52) U.S. Cl.
CPC ....... *G01N 29/041* (2013.01); *G01N 29/2418* (2013.01); *G01N 2291/2634* (2013.01)

(58) Field of Classification Search
CPC ............. G01N 29/041; G01N 29/2418; G01N 2291/2634; G01M 7/00; B23K 31/00
See application file for complete search history.

(56) References Cited

U.S. PATENT DOCUMENTS

| | | | |
|---|---|---|---|
| 4,408,881 A | 10/1983 | Clarady, Jr. et al. | |
| 5,392,652 A | * 2/1995 | Levesque | ............... G01N 29/28 73/632 |

(Continued)

FOREIGN PATENT DOCUMENTS

| | | |
|---|---|---|
| CN | 109030624 A | 12/2018 |
| JP | S58-115330 A | 7/1983 |

(Continued)

OTHER PUBLICATIONS

Written Opinion by the International Search Authority for corresponding PCT application No. PCT/JP2020/016301, dated Jun. 23, 2020, submitted with a machine translation.

(Continued)

*Primary Examiner* — Francis C Gray
(74) *Attorney, Agent, or Firm* — Muir Patent Law, PLLC (57) ABSTRACT

The method for examining a clinched portion of a tubular body includes the steps of: giving an elastic vibration to a clinched body 90 formed by clinching a tubular body 91 with a clinch-target member 92; and acquiring, for each of a plurality of view areas 95 which differ from each other in the position in the circumferential direction of the tubular body 91, a vibration distribution optically and simultaneously measured within the view area 95 including a clinched portion 93 of the tubular body 91 and the clinch-target member 92, to determine whether or not the state of clinching is satisfactory over the entire clinched portion 93.

8 Claims, 9 Drawing Sheets

(56) References Cited

U.S. PATENT DOCUMENTS

| | | | |
|---|---|---|---|
| 2012/0247208 A1* | 10/2012 | Takahashi | B25J 15/0616 |
| | | | 901/44 |
| 2017/0350690 A1 | 12/2017 | Hatahori et al. | |
| 2018/0283847 A1* | 10/2018 | Hatahori | G01N 29/043 |
| 2019/0242854 A1* | 8/2019 | Matsui | G01N 29/221 |

FOREIGN PATENT DOCUMENTS

| | | | |
|---|---|---|---|
| JP | 2007-240344 A | | 9/2007 |
| JP | 2009-098031 A | | 5/2009 |
| JP | 2009098031 A | * | 5/2009 |
| JP | 2017-131959 A | | 8/2017 |
| JP | 2017-219318 A | | 12/2017 |

OTHER PUBLICATIONS

Second Office Action dated Feb. 21, 2023 issued for the corresponding Japanese Patent Application No. 2021-522689.

Yamamoto et al., "Vibration Measurement of an Ultrasonic Motor Using Stroboscopic Phase-shift Interferometry", Mar. 31, 2001.

Notice of Allowance dated May 9, 2023 issued for the corresponding Japanese Patent Application No. 2021-522689.

1 First Office Action dated Dec. 13, 2022 issued for corresponding Japanese Patent Application No. 2021-522689.

First Office Action dated Jan. 30, 2024 issued for the corresponding Chinese Patent Application No. 202080034523.1.

\* cited by examiner

FROM LOWER SIDE

LONGITUDINAL DIRECTION

CIRCUMFERENTIAL DIRECTION

FROM RIGHT SIDE

LONGITUDINAL DIRECTION

CIRCUMFERENTIAL DIRECTION

METHOD AND DEVICE FOR EXAMINING CLINCHED PORTION OF TUBULAR BODY

TECHNICAL FIELD

The present invention relates to a method and device for examining a clinched portion of a tubular body.

BACKGROUND ART

A clinched body formed by clinching a metallic tubular body with another member ("clinch-target member") is used in the parts of automobiles or other products. Patent Literature 1 discloses a method for clinching a tubular body with a clinch-target member by passing the tubular body through a hole formed in the clinch-target member and increasing the diameter of the tubular body to press the tubular body onto the clinch-target member. According to Patent Literature 1, the task of increasing the diameter of the tubular body is achieved by a method including the steps of inserting a coil into the tubular body so that the coil is located at the position of the hole in the clinch-target member, and instantaneously passing an extremely large amount of electric current through the coil. A magnetic field is thereby generated from the coil. The magnetic field induces eddy current in the tubular body. This generates a Lorentz force which acts between the coil and the tubular body, causing the increase in the diameter of the tubular body. This method can be suitably used for a tubular body made of a material having a high level of electric conductivity, such as aluminum. There are also mechanical techniques which are less productive than the previously described technique yet can produce a similar state of clinching. For example, an expansion-contraction mechanism may be inserted into the tubular body to increase its diameter. A rubber part or similar elastic body may be provided within the tubular body to increase its diameter by elastic deformation. An incompressible fluid may be introduced into the tubular body to apply high pressure.

CITATION LIST

Patent Literature

Patent Literature 1: JP 2017-131959 A

SUMMARY OF INVENTION

Technical Problem

After such a clinching process has been completed, whether or not the tubular body and the clinch-target member are sufficiently clinched should be examined. One method for such an examination is an X-ray computed tomographic (CT) examination. However, an X-ray CT examination which is performed with a sufficiently large field of view applicable to such an examination of the clinched body cannot detect a gap that is narrower than 1 µm. Even such a narrow gap can cause problems with the parts of automobiles or other products.

The problem to be solved by the present invention is to provide a method and device by which imperfect clinching due to a micro-sized gap between the tubular body and the clinch-target member can be assuredly detected.

Solution to Problem

A method for examining a clinched portion of a tubular body according to the present invention developed for solving the previously describe problem includes the steps of: giving an elastic vibration (which is hereinafter simply called the "vibration") to a clinched body formed by clinching a tubular body with a clinch-target member; and acquiring, for each of a plurality of view areas which differ from each other in the position in the circumferential direction of the tubular body, a vibration distribution optically and simultaneously measured within the view area including a clinched portion of the tubular body and the clinch-target member, to determine whether or not the state of clinching is satisfactory over the entire clinched portion.

A device for examining a clinched portion of a tubular body according to the present invention includes:

a vibration source configured to give a vibration to a clinched body formed by clinching a tubular body with a clinch-target member; and a vibration distribution acquirer configured to acquire, for each of a plurality of view areas which differ from each other in the position in the circumferential direction of the tubular body, a vibration distribution optically and simultaneously measured within the view area including a clinched portion of the tubular body and the clinch-target member.

Advantageous Effects of Invention

According to the present invention, imperfect clinching due to a micro-sized gap between a tubular body and a clinch-target member can be assuredly detected.

DESCRIPTION OF EMBODIMENTS

An embodiment of the method and device for examining a clinched portion of a tubular body according to the present invention is hereinafter described using FIGS. 1-13.

Figure 1:
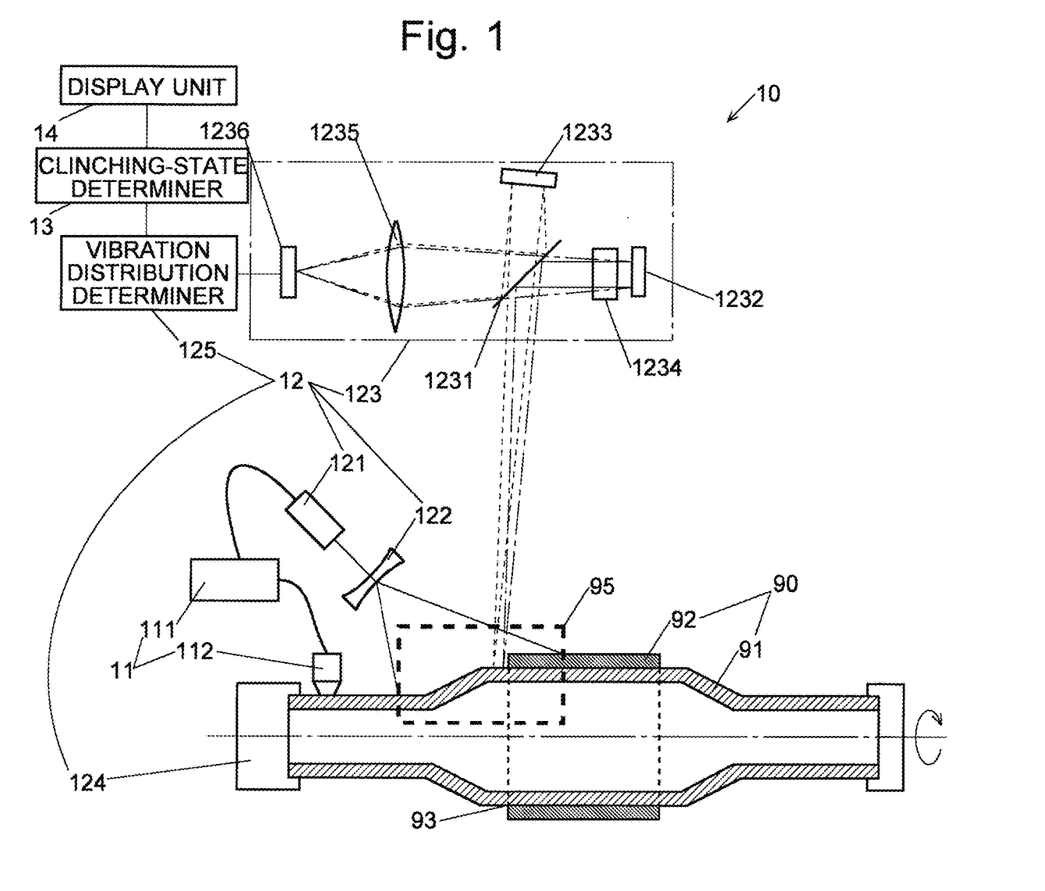
FIG. 1 is a schematic configuration diagram showing one embodiment of a device for examining a clinched portion of a tubular body according to the present invention.
Figure 2:
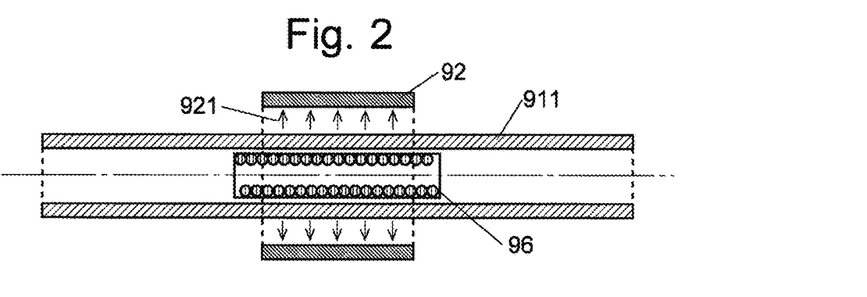
FIG. 2 is a sectional view showing a method for producing a clinched body to be examined in the examination device and examination method according to the present embodiment.

(1) Configuration of Device for Examining Clinched Portion of Tubular Body According to Present Embodiment FIG. 1 shows the device 10 for examining a clinched portion of a tubular body according to the present embodiment (which is hereinafter simply called the "examination device"). The examination device 10 includes a vibration source 11, vibration distribution acquirer 12 and clinching-state determiner 13.

The examination device 10 is configured to examine a clinched body 90 formed by clinching a tubular body 91 with a clinch-target member 92, to determine whether or not the tubular body 91 and the clinch-target member 92 are satisfactorily clinched together. Details of the clinched body 90 are hereinafter described using FIGS. 1 and 2. The clinched body 90 is created by the method shown in FIG. 2. The tubular body 911 before being clinched with the clinch-target member 92 is a metallic tube which is uniform in both inner and outer diameters. The clinch-target member 92 is a member having a hole 921 whose diameter is larger than the tubular body 911. In order to produce the clinched body 90, the tubular body 911 is initially inserted into the hole 921. A coil 96 is subsequently arranged within the tubular body 911 at a position corresponding to the inside of the hole, with the axis of the coil 96 being parallel to that of the tubular body 911. In this state, a large amount of pulse current is instantaneously passed through the coil 96. A magnetic field is thereby generated from the coil 96, and this magnetic field induces eddy current in the tubular body 911. The eddy current generates a Lorentz force acting between the coil 96 and the tubular body 911. This force increases the diameter of the tubular body 911. The tubular body 911 having the increased diameter is pressed onto the clinch-target member 92, whereby the two parts are clinched together (FIG. 1).

The method for increasing the diameter of the tubular body 911 is not limited to the one described in this paragraph. Other methods are also applicable, such as the previously mentioned techniques which use an expansion-contraction mechanism, elastic body, or incompressible fluid.

Referring once more to FIG. 1, details of each component of the examination device 10 will be hereinafter described.

The vibration source 11 includes a signal generator 111 and a vibrator 112. The signal generator 111 is electrically connected to the vibrator 112 by a cable to generate an AC electric signal and send it to the vibrator 112. When in use, the vibrator 112 is held in contact with the clinched body 90, receives the AC electric signal from the signal generator 111, converts the signal into mechanical vibrations, and gives the mechanical vibrations to the clinched body 90. The contact position of the vibrator 112 may be located on either the tubular body 91 or the clinch-target member 92 of the clinched body 90, provided that the contact position is outside the view area 95 (which will be described later). There is no specific limitation on the shape of the vibrator 112, although it is preferable to provide the vibrator 112 with a pointing tip so that its contact area becomes small and allows for an easy contact with the curved surface of the tubular body 91.

The vibration distribution acquirer 12 includes a laser light source 121, illumination light lens 122, speckle-shearing interferometer 123, rotary mechanism 124 and vibration distribution determiner 125.

The laser light source 121 is electrically connected to the signal generator 111 by a cable (which is different from the one that connects the signal generator 111 and the vibrator 112), and emits pulsed laser light at a timing when the AC electric signal is at a predetermined phase. The illumination light lens 122, which is located between the laser light source 121 and the clinched body 90, consists of a concave lens. The illumination light lens 122 has the function of increasing the diameter of the pulsed laser light from the laser light source 121 so as to cast the pulsed laser light onto an area including a section of the clinched portion 93 of the clinched body 90. The entire area to be illuminated with the pulsed laser light, or a portion of that area including a section of the clinched portion 93, is defined as the view area 95.

The speckle-shearing interferometer 123 includes a beam splitter 1231, first reflector 1232, second reflector 1233, phase shifter 1234, converging lens 1235 and image sensor 1236. The beam splitter 1231 is a half mirror located at an incident position of the pulsed laser light reflected on the surface of the clinched body 90 at each point within the view area 95. The first reflector 1232 is located on the optical path of the pulsed laser light reflected by the beam splitter 1231, while the second reflector 1233 is located on the optical path of the pulsed laser light passing through the beam splitter 1231. The phase shifter 1234, which is located between the beam splitter 1231 and the first reflector 1232, is configured to change (shift) the phase of the pulsed laser light passing through the phase shifter 1234. The image sensor 1236 is located on the optical path of the pulsed laser light passing through the beam splitter 1231 after being successively reflected by the beam splitter 1231 and the first reflector 1232, as well as on the optical path of the pulsed laser light reflected by the beam splitter 1231 after being reflected by the second reflector 1233 after passing through the beam splitter 1231. The converging lens 1235 is located between the beam splitter 1231 and the image sensor 1236.

The first reflector 1232 is arranged so that its reflection surface is at an angle of 45 degrees to the reflection surface of the beam splitter 1231. By comparison, the second reflector 1233 is arranged so that its reflection surface is at an angle slightly deviated from the angle of 45 degrees to the reflection surface of the beam splitter 1231. The image sensor 1236 has a large number of detection elements. The components of light originating from a large number of points on the surface of the clinched body 90 within the view area 95 travel through the first reflector 1232 and the phase shifter 1234, and fall onto the image sensor 1236, to be respectively detected by different detection elements. Each detection element produces an electric signal corresponding to the intensity of the detected component of light.

The rotary mechanism 124 is a device configured to rotate the tubular body 91 of the clinched body 90 about its axis. It includes a holding part which holds one end of the tubular body 91 and a motor (not shown) configured to rotate the holding part. The rotary mechanism 124 can be moved so that the clinched portion 93 of the clinched body 90 held with the holding part is located within the view area 95. It is also possible to configure the device so that an operator can manually rotate the tubular body 91 without using the rotary mechanism 124.

The vibration distribution determiner 125 is configured to determine the distribution of the vibration of (the tubular body 90 within) the view area 95, as will be described later, based on the electric signals generated by the detection elements of the image sensor 1236.

The clinching-state determiner 13 is configured to determine, as will be described later, whether or not the state of clinching at the clinched portion 93 is satisfactory based on a vibration distribution within the view area 95 determined by the vibration distribution determiner 125, i.e. acquired by the vibration distribution acquirer 12.

The vibration distribution determiner 125 and the clinching-state determiner 13 are embodied by a CPU and other hardware devices as well as a software system configured to determine the vibration distribution within the view area 95 and determine whether or not the state of clinching at the clinched portion 93 is satisfactory.

The examination device 10 according to the present embodiment additionally includes a display unit 14, which is a display for showing the result of the determination by the clinching-state determiner 13 and other pieces of information, an input unit (not shown) for allowing an operator to enter information into the examination device 10, as well as a control unit (not shown) configured to control the signal generator 111, speckle-shearing interferometer 123 and rotary mechanism 124.

Figure 3:
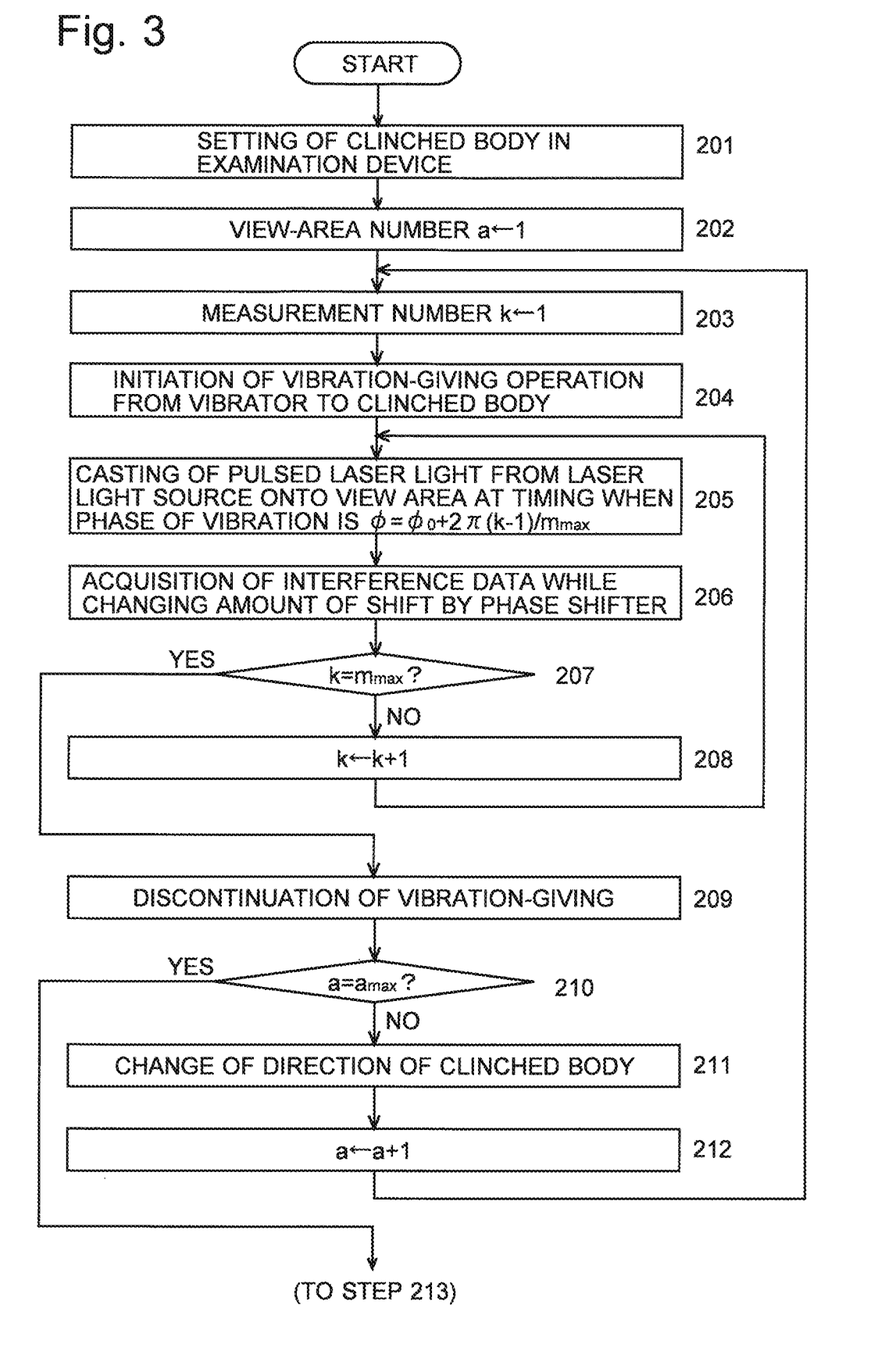
FIG. 3 is a portion of the flowchart showing an operation of the examination device according to the present embodiment and the examination method according to the present embodiment, the portion showing the steps from the beginning of the entire operation through a vibration measurement for a plurality of view areas.
Figure 4:
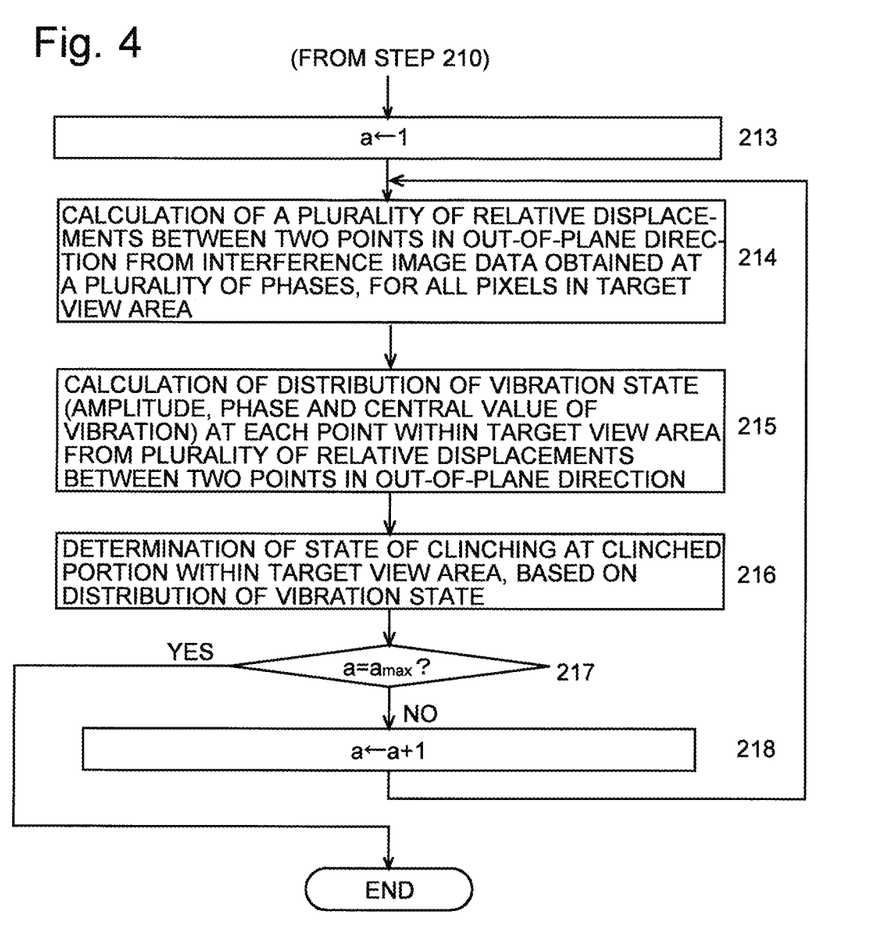
FIG. 4 is a portion of the flowchart showing an operation of the examination device according to the present embodiment and the examination method according to the present embodiment, the portion showing the steps from the completion of the vibration measurement to the completion of the entire operation.

(2) Operation of Examination Device According to Present Embodiment, and Method for Examining Clinched Portion of Tubular Body According to Present Embodiment An operation of the examination device 10 according to the present embodiment is hereinafter described using FIGS. 3-6. The method for examining a clinched portion of a tubular body according to the present embodiment is carried out by operating this examination device 10. The sequence of the operations of the examination device 10 is shown in the flowchart of FIGS. 3 and 4. The descriptions below will follow this flowchart.

Initially, one end of the clinched body 90 is held with the holding portion of the rotary mechanism 124. This rotary mechanism 124 is subsequently moved so that the clinched portion 93 is located within the view area 95. Thus, the clinched body 90 is set in the examination device 10 (Step 201).

Figure 5:
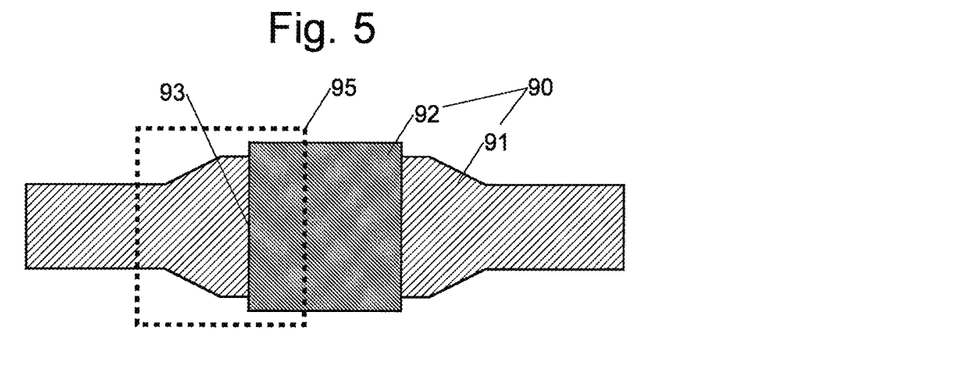
FIG. 5 is a plan view showing a clinched body formed by clinching a tubular body with a clinch-target member as well as a view area, as viewed from a speckle-shearing interferometer.

The view area 95 is an area which appears to be a plane when viewed from the speckle-shearing interferometer 123 (FIG. 5). On the other hand, the clinched portion 93 is a tubular portion surrounding the tubular body 91. Therefore, one view area 95 includes only a portion of the clinched portion 93. Therefore, in the examination device and examination method according to the present embodiment, the measurement for the entire clinched portion 93 is performed by repeating, $a_{max}$ times (where $a_{max}$ is an integer equal to or greater than two), the steps of performing the vibration measurement at one view area 95 and subsequently rotating the clinched body 90 with the rotary mechanism 124 by $360/a_{max}$ degrees to perform the measurement at another view area 95. Serial numbers 1 to $a_{max}$ are assigned to the $a_{max}$ view areas 95 at each of which the vibration measurement should be performed (this serial number is hereinafter called the "view-area number a"). In the present embodiment, $a_{max}$ is 4. The angle by which the clinched body 90 is rotated each time is 90 degrees in the present embodiment.

The view-area number a is given an initial value of "1" (Step 202), the measurement for the view area 95 having the view-area number 1 is performed by the following operations of Steps 203 through 208.

In one view area, the measurement is performed $m_{max}$ times at different phases of the vibration of the vibrator 112 (where $m_{max}$ is an integer equal to or greater than three). The phase of the vibration of the vibrator 112 is the phase of the AC electric signal sent from the signal generator 111 to the vibrator 112, which corresponds to the phase of the vibration induced in the clinched body 90 at the point of contact of the vibrator 112. In the following description, each measurement is referred to as the "kth measurement" using a numerical value k (which is a natural number within a range from 1 to $m_{max}$). The following description deals with the case of $m_{max}=3$ as one example.

First, the initial value of k is set at 1 (Step 203), and the AC electric signal is sent from the signal generator 111 to the vibrator 112 to initiate the operation of giving vibrations from the vibrator 112 to the clinched body 90 (Step 204).

Next, the signal generator 111 sends a pulsed signal to the laser light source 121 at every timing at which the phase of the vibration of the vibrator 112 is expressed by $[\phi_0+2\pi(k-1)/m_{max}]$, where $\phi_0$ is a predetermined initial value (e.g. $\phi_0=0$). Since k=1 at this stage, the phase of the vibration of the vibrator 112 is $\phi_0$ when the pulsed signal is sent. The laser light source 121 repeatedly emits the pulsed laser light as the illumination light every time it receives the pulse signal. This illumination light is expanded by the illumination light lens 122 in the diametrical direction before being cast onto the surface of the clinched body 90 including the view area 95 (Step 205).

The illumination light is reflected on the surface of the clinched body 90 and falls onto the beam splitter 1231 in the speckle-shearing interferometer 123. A portion of the illumination light is reflected by the beam splitter 1231 and passes through the phase shifter 1234. After being reflected by the first reflector 1232, the light once more passes through the phase shifter 1234. A portion of this light passes through the beam splitter 1231 and falls onto the image sensor 1236 via the converging lens 1235. Meanwhile, the remaining portion of the illumination light which has fallen onto the beam splitter 1231 passes through this beam splitter 1231. After being reflected by the second reflector 1233, a portion of this light is reflected by the beam splitter 1231 and falls onto the image sensor 1236 via the converging lens 1235. In the image sensor 1236, the components of the irradiation light reflected at a large number of points on the surface of the clinched body 90 are respectively detected by different detection elements. Each detection element receives not only a component of the irradiation light reflected at one point on the surface of the clinched body 90 but also another component of the irradiation light reflected at a point slightly displaced from that one point.

The phase shifter 1234 gradually changes (shifts) the phase of the irradiation light passing through the phase shifter 1234 while the illumination light, i.e. the pulsed laser light, is repeatedly generated. As a result, a gradual change in phase difference occurs between a component of the irradiation light falling onto one detection element of the image sensor 1236 after being reflected by one point on the surface of the clinched body 90 and another component of the irradiation light falling onto the same detection element after being reflected by another point slightly displaced from that one point. During such a change, each detection element of the image sensor 1236 continuously detects the intensity of the interference light resulting from the interference of the two components of the irradiation light (Step 206).

Figure 6:
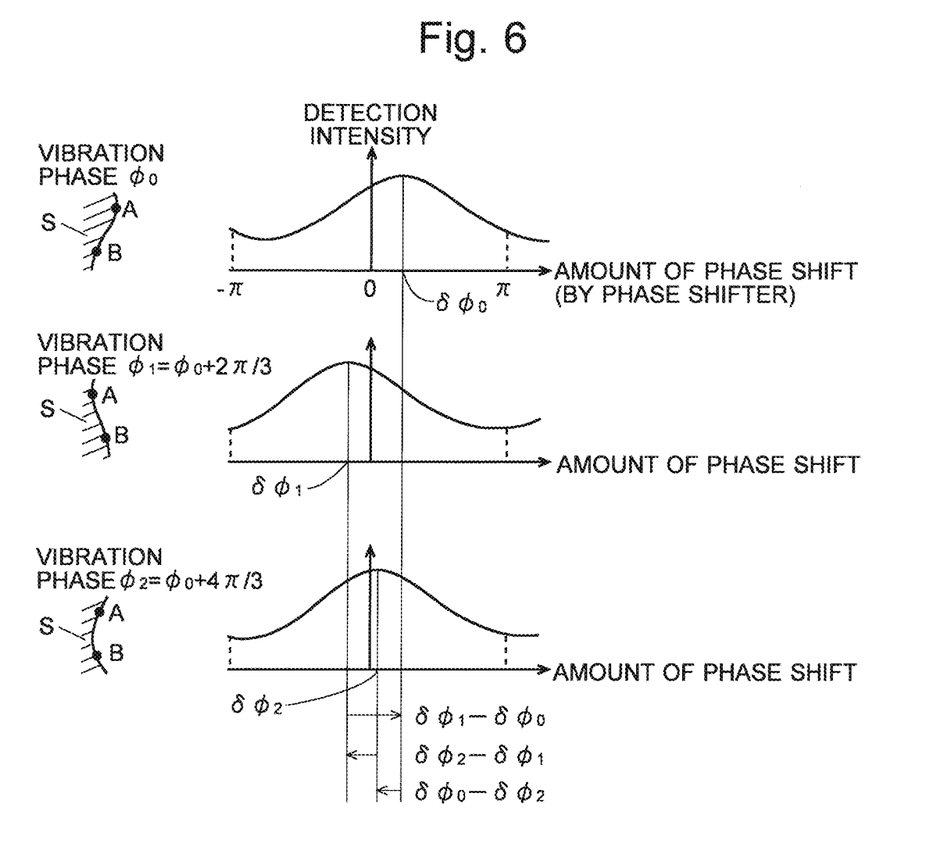
FIG. 6 is a diagram for explaining a method for determining the state of vibration at each point within a view area during an operation of the examination device according to the present embodiment.

The upper drawing in FIG. 6 graphically shows one example of the amount of phase shift by the phase shifter 1234 and the intensity of the interference light detected by a detection element of the image sensor 1236 when the phase of the vibration of the vibrator 112 is $\phi_0$. In FIG. 6, the relationship in which the detection intensity sinusoidally changes with the amount of phase shift is represented by a continuous curve. It should be noted that the data obtained by actual measurements are in a discrete form, and the continuous sinusoidal waveform is reproduced from those measured data by the least squares or other appropriate methods. To this end, it is necessary to detect the intensity at three or more different amounts of phase shift.

Subsequently, whether or not the value of k has reached $m_{max}$ is determined (Step 207). Since k=1 and has not yet reached $m_{max}$ (which is 3 in the present example) at this stage, the determination result of Step 207 is "NO". When the result is "NO", the operation proceeds to Step 208 to increase the value of k by 1, i.e. to "2" (the case where the determination result is "YES" in Step 208 will be described later).

Next, the operation returns to Step 205. The signal generator 111 sends a pulse signal to the laser light source 121 at every timing at which the phase of the vibration of the vibrator 112 is expressed by $[\phi_0+2\pi(k-1)/m_{max}]$ in which k=2, i.e. $[\phi_0+2\pi/3]\equiv\phi_1$. The laser light source 121 repeatedly casts the pulsed laser light as the illumination light onto the surface of the clinched body 90 every time it receives the pulse signal. Each detection element of the image sensor 1236 continuously detects the intensity of the interference light while the phase of the irradiation light reflected at each point within the view area is successively changed (shifted) to at least three values by the phase shifter 1234 (Step 206).

The middle drawing in FIG. 6 graphically shows one example of the amount of phase shift by the phase shifter 1234 and the intensity of the interference light detected by a detection element of the image sensor 1236, acquired when the phase of the vibration of the vibrator 112 is $\phi_1$. A comparison of the middle drawing and the upper drawing in FIG. 6 demonstrates that the peak positions of the intensity of the interference light in the two drawings differ from each other by $\delta\phi_1-\delta\phi_0$. This difference indicates that the phase difference of the optical path between a component of the irradiation light reflected at one point on the surface of the clinched body 90 and another component of the irradiation light reflected at another point slightly displaced from that one point has changed due to the change in the phase of the vibration of the vibrator 112 at the point in time of the detection. This change in phase difference of the optical path indicates that the relative displacement between those two points in an out-of-plane direction has changed.

After the operation in Step 206 at the stage of k=2 has been completed in this manner, the value of k has not yet reached $m_{max}$ (=3), so that the determination result in Step 207 is "NO" and the value of k is increased to "3" in Step 208. Subsequently, the operation returns to Step 205. The laser light source 121 repeatedly casts the pulsed laser light as the illumination light onto the surface of the clinched body 90 at every timing at which the phase of the AC electric signal is expressed by $[\phi_0+2\pi(k-1)/m_{max}]$ in which k=3, i.e. $[\phi_0+4\pi/3]\equiv\phi_2$. Each detection element of the image sensor 1236 continuously detects the intensity of the interference light (Step 206). As a result, the relationship between the amount of phase shift by the phase shifter 1234 and the intensity of the interference light for the AC electric signal at the phase of $\phi_2$ is obtained, as shown in the lower drawing in FIG. 6.

Subsequently, in Step 207, since the value of k is 3 and has reached $m_{max}$, the determination result is "YES", and the operation proceeds to Step 209. In Step 209, the transmission of the AC electric signal from the signal generator 111 to the vibrator 112 is discontinued. Consequently, the vibrator 112 stops vibrating.

By the operations described to this point, the acquisition of the data in one view area 95 having the view-area number a=1 is completed. In Step 210, whether or not the value of a has reached $a_{max}$ is determined. In the example described to this point, since the value of a has not yet reached $a_{max}$ ("NO" in Step 210), the operation proceeds to Step 211 (the case where the determination result is "YES" in Step 210 will be described later).

In Step 211, the tubular body 91 of the clinched body 90 is rotated by the rotary mechanism 124 around the axis of the tubular body 91 by $360/a_{max}$ degrees to change the direction of the clinched body 90. By this operation, the view area 95 is also changed. Subsequently, the value of the view-area number a is increased by 1 (Step 212). Thus, the new view area 95 has a view-area number of a=2.

Subsequently, the operation proceeds to Step 203 to perform the operations of Steps 203 through 209 for the new view area 95 and acquire the relationship between the amount of phase shift and the intensity of the interference light at each point within the view area 95. Subsequently, if the determination result in Step 210 is "NO", the operations of Steps 211 and 212 are performed, and the operations of Steps 203 through 209 are further performed. After the operations of Steps 203 through 209 for the view area 95 having the view-area number $a_{max}$ have been completed, the determination result in Step 210 becomes "YES", and the operation proceeds to Step 213. Through the operations performed until the transition to Step 213, the measurement of the vibration is completed. The task to be subsequently performed is the analysis of the acquired data.

The data analysis is individually performed for each of the $a_{max}$ view areas 95. First, the view-area number a is given an initial value of "1" (Step 213), and the distribution of the vibration state (amplitude and/or phase) at each point within the view area 95 having the view-area number a=1 (vibration distribution) is determined as follows: Initially, for each detection element of the image sensor, the maximum output phase shifts $\delta\phi_0$, $\delta\phi_1$ and $\delta\phi_2$ at which the output of the detection element is maximized within the period in which the amount of phase shift was changed by the phase shifter 1234 are determined at each of the three vibration phases of $\phi_0$, $\phi_1$ and $\phi_2$, respectively (see the upper, middle and lower graphs in FIG. 6). Furthermore, the differences between the maximum output phase shifts at the different phases of vibration, i.e. ($\delta\phi_1-\delta\phi_0$), ($\delta\phi_2-\delta\phi_1$) and ($\delta\phi_0-\delta\phi_2$), are determined. These three differences of the maximum output phase shifts are three sets of data which show, for each point within the view area 95, a relative displacement in an out-of-plane direction between the point in question and another point slightly displaced from that point, where each set of data includes two values obtained at different phases of the vibration of the vibrator 112, i.e. at different points in time (Step 214). Based on those three values of the relative displacement, the values of the following three parameters can be obtained for each point within the view area 95: the amplitude of the vibration, phase of the vibration, and central value (DC component) of the vibration (Step 215).

The obtained values of the amplitude and phase of the vibration at each point contain information which shows whether or not the state of clinching at the clinched portion 93 is satisfactory. That is to say, if the tubular body 91 and the clinch-target member 92 are satisfactorily clinched, the amplitude of the vibration normally becomes small in the vicinity of the clinched portion 93, since the tubular body 91 is bound by the clinch-target member 92. By comparison, if the tubular body 91 and the clinch-target member 92 are not satisfactorily clinched due to the presence of a micro-sized gap between the two parts, the amplitude of the vibration becomes large at and around the clinched portion 93 since the tubular body 91 is not bound by the clinch-target member 92. Accordingly, based on the obtained vibration distribution, it is possible to determine whether or not the state of clinching at the clinched portion 93, and specifically, at the end of the clinch-target member 92 is satisfactory (Step 216).

After the determination on whether or not the state of clinching at the clinched portion 93 within the view area 95 having the view-area number a=1 is satisfactory has been completed in the previously described manner, whether or not the value of a has reached $a_{max}$ is determined (Step 217). If the value has not yet reached $a_{max}$ (if "NO" in Step 217), the value of a is increased by 1 (Step 218), and the operations of Steps 214 through 216 are performed to determine whether or not the state of clinching at the clinched portion 93 within the view area 95 having the next view-area number is satisfactory. If the value of a in Step 217 has reached $a_{max}$, it means that the determination on whether or not the state of clinching is satisfactory has been completed for all view areas 95, so that the entire sequence of operation is discontinued.

The example described so far has assumed that $m_{max}$=3. Selecting a value of m which is greater than [2n+1] (where n is a natural number equal to or greater than two) enables the detection of the nth-order component (nth harmonic component) of the vibration induced in the clinched body 90. Whether or not the state of clinching at the clinched portion 93 is satisfactory may also be determined based on the distribution of the vibration of those higher-order harmonic components in addition to the fundamental harmonic.

Figure 7:
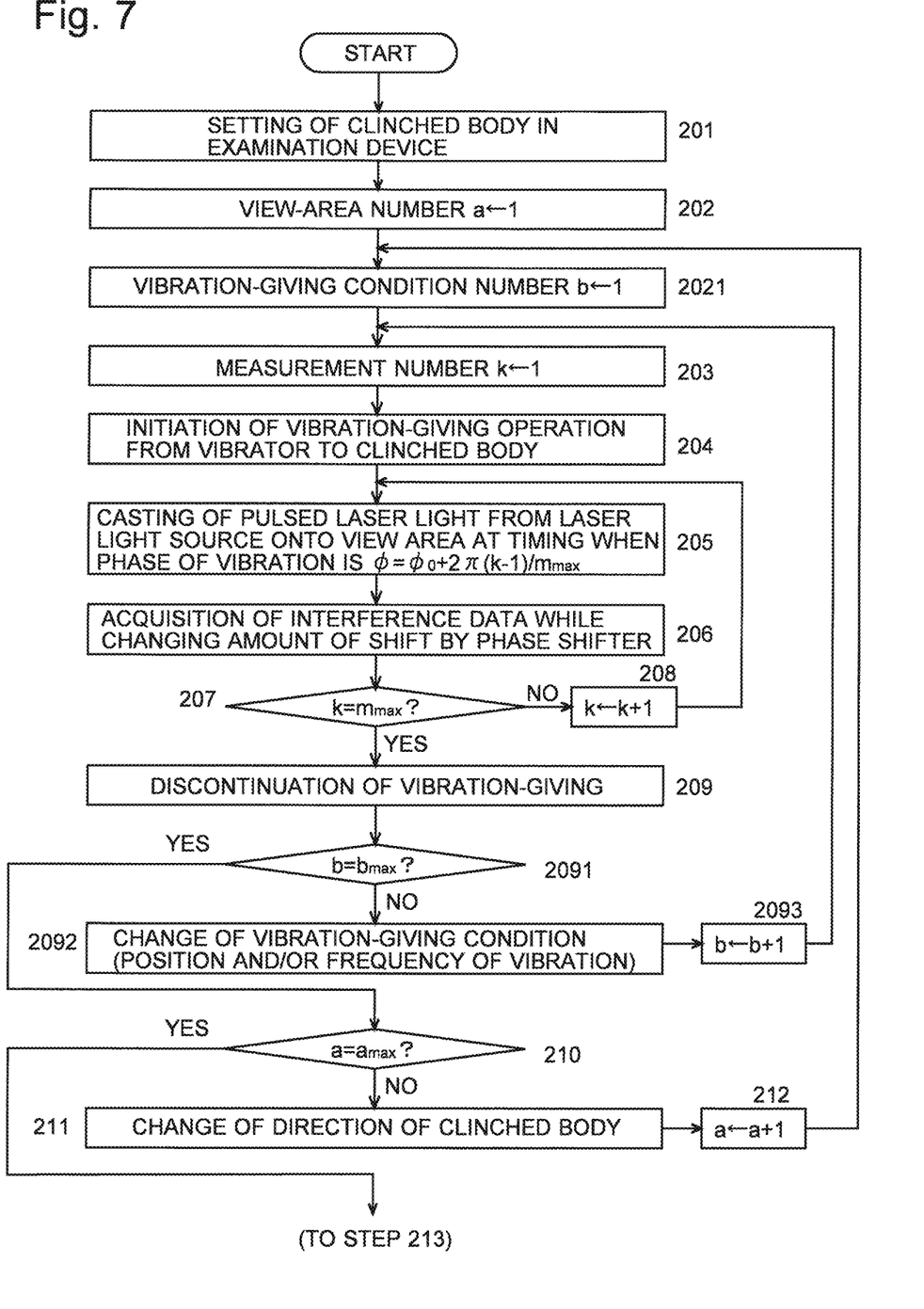
FIG. 7 is a portion of the flowchart showing a variation of the operation of the examination device and the examination method, the portion showing the steps from the beginning of the entire operation through a vibration measurement for a plurality of view areas.
Figure 8:
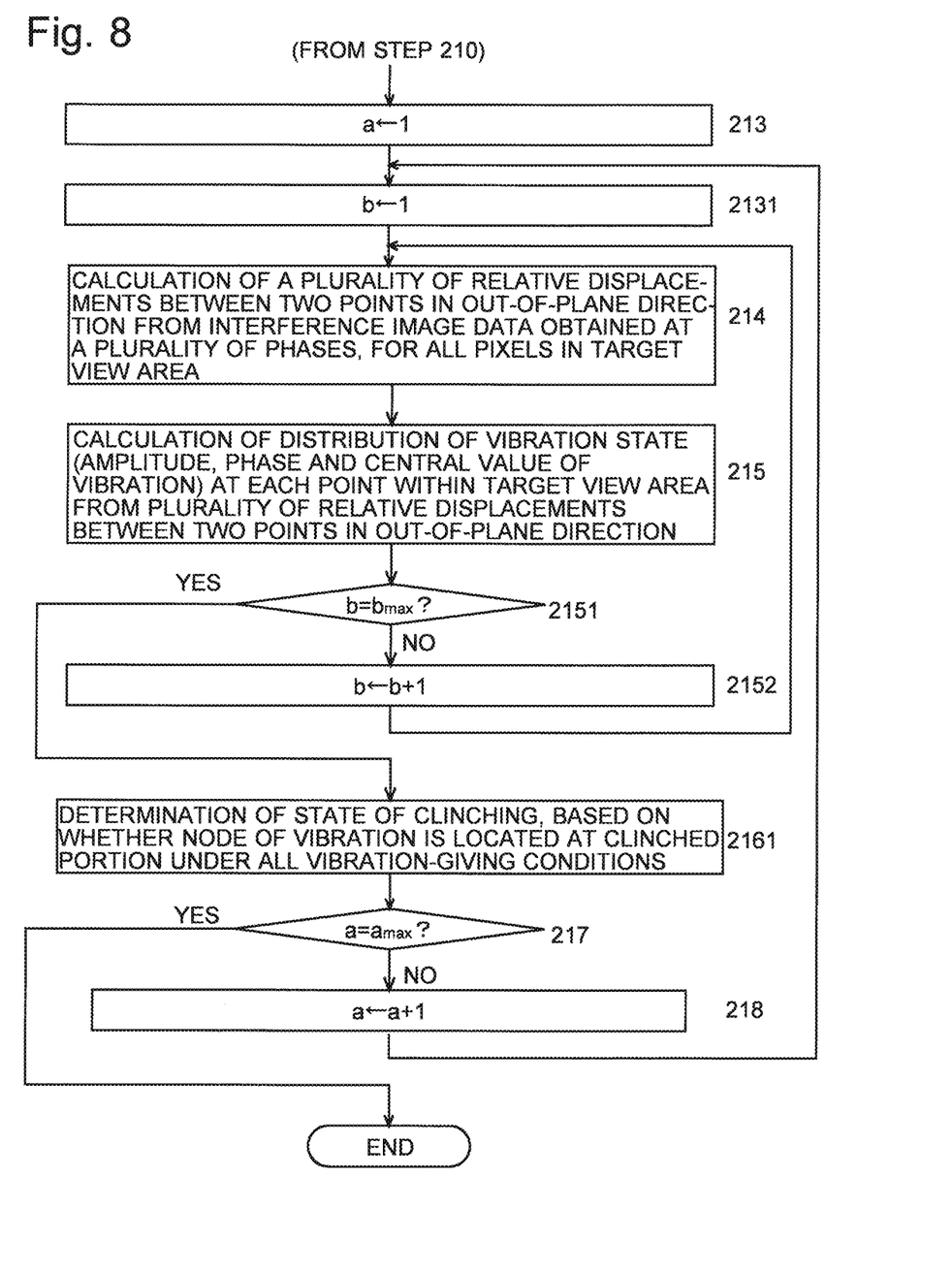
FIG. 8 is a portion of the flowchart showing the variation of the operation of the examination device and the examination method, the portion showing the steps from the completion of the vibration measurement to the completion of the entire operation.
Figure 9:
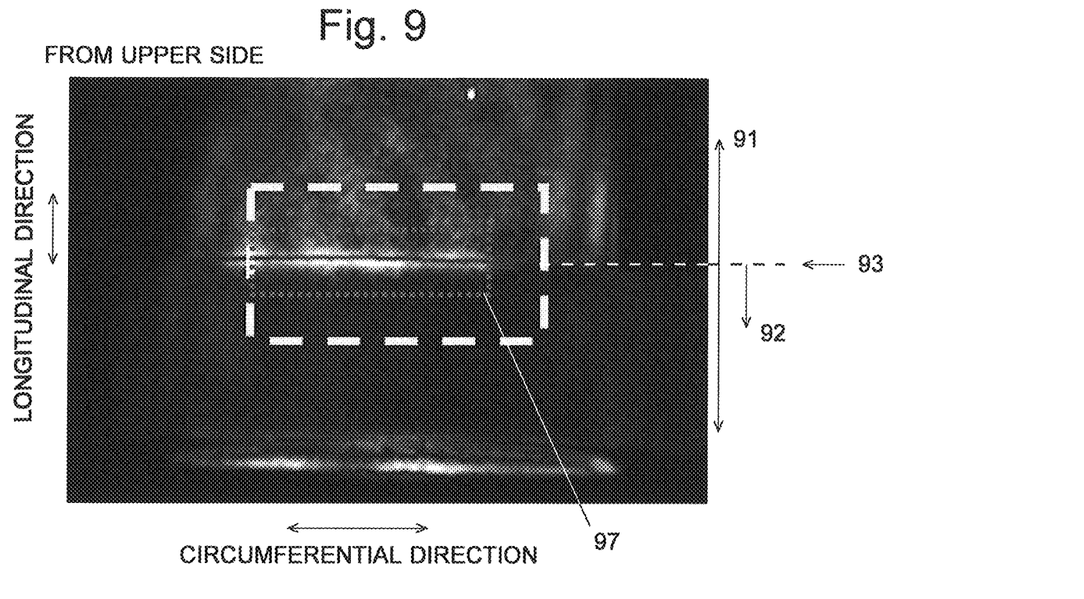
FIG. 9 is an image showing a result obtained by carrying out an examination method according to the variation using an examination device according to the present embodiment, the image showing the vibration distribution determined by observing the clinched body from the upper side.
Figure 10:
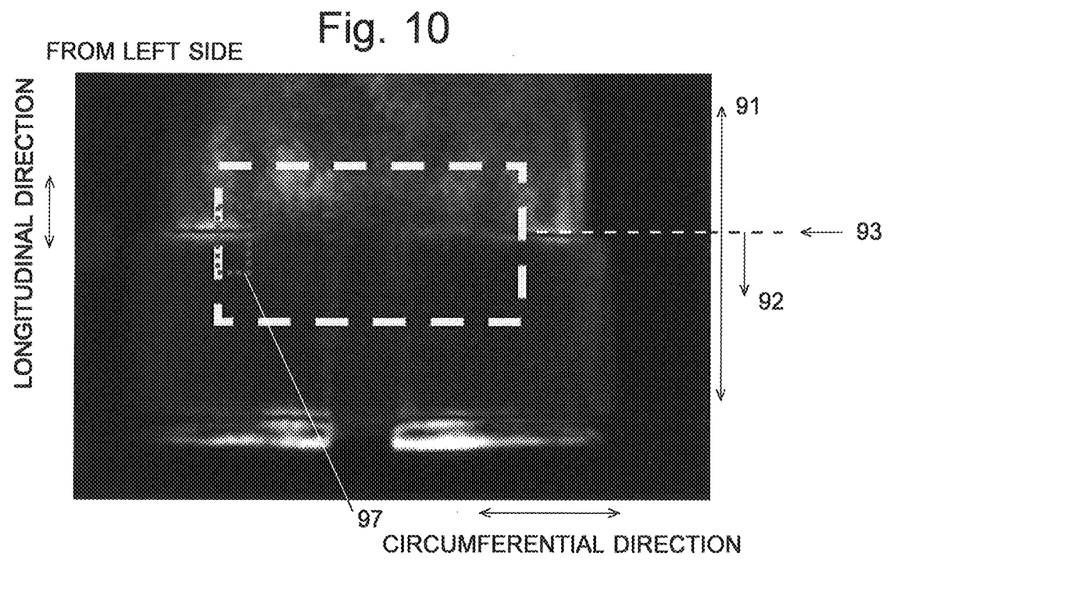
FIG. 10 is an image showing a result obtained by carrying out an examination method according to the variation using an examination device according to the present embodiment, the image showing the vibration distribution determined by observing the clinched body from the left side.
Figure 11:
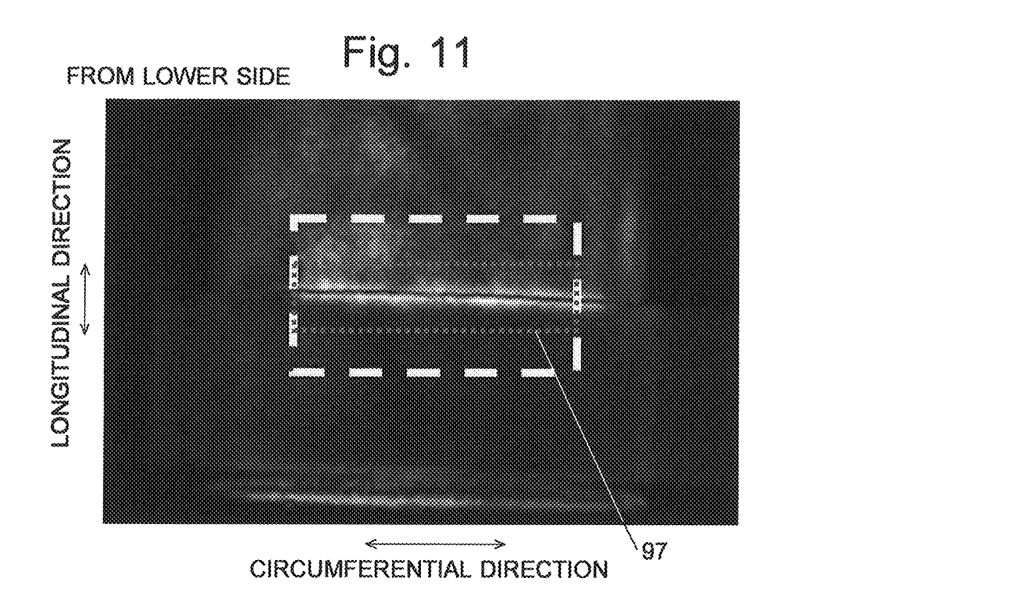
FIG. 11 is an image showing a result obtained by carrying out an examination method according to the variation using an examination device according to the present embodiment, the image showing the vibration distribution determined by observing the clinched body from the bottom side.
Figure 12:
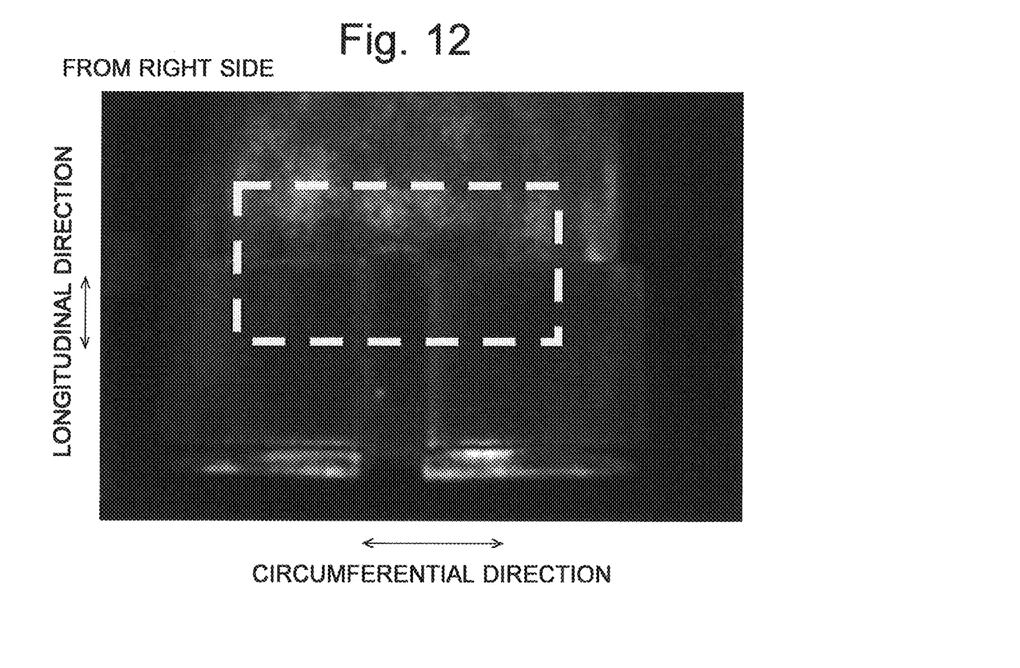
FIG. 12 is an image showing a result obtained by carrying out an examination method according to the variation using an examination device according to the present embodiment, the image showing the vibration distribution determined by observing the clinched body from the right side.

(3) Variation of Operation of Examination Device According to Present Embodiment, and Variation of Examination Method An example is hereinafter described using the flowchart of FIGS. 7 and 8 in which the operation and examination method of the examination device 10 according to the present embodiment are modified while there is no change in the configuration of the device. In the flowchart shown in FIGS. 7 and 8, the steps which are identical to those shown in the flowchart shown in FIGS. 3 and 4 are denoted by the same reference signs, and the descriptions of those steps will be simplified.

In the present variation, as will be described later, the state of vibration within one view area is determined in $b_{max}$ kinds of measurement modes (where $b_{max}$ is an integer equal to or greater than two) which differ from each other in either the contact position of the vibrator 112 on the clinched body 90 (i.e. the position at which the vibration is given) or the vibration frequency of the vibrator 112, or both. The larger the value of $b_{max}$, the more reliable the determination on whether or not the clinching is satisfactory, although it means a corresponding increase in the period of time required for the measurement. The value should normally be within a range from 3 to 5. The combination of the position at which the vibration is given, and the frequency of the vibration, is hereinafter called the "vibration-giving condition". The vibration-giving conditions are sequentially and individually denoted by the vibration-giving condition number b from 1 to $b_{max}$.

Initially, as in the previous embodiment, the clinched body 90 is set in the examination device 10 (Step 201), and the view-area number a is given an initial value of "1" (Step 202). Next, the vibration-giving condition number b is given an initial value of "1" (Step 2021). Subsequently, the measurement according to Steps 203 through 209 is performed by the same method as in the previous embodiment for the view area 95 of a=1 under the vibration-giving condition of b=1.

Next, whether or not the value of b has reached $b_{max}$ is determined (Step 2091). In the present case, since b=1 and has not yet reached $b_{max}$ ("NO" in Step 2091), the operation proceeds to Step 2092 to change the vibration-giving condition, i.e. the position of the vibrator 112 and/or the vibration frequency of the vibrator 112. Furthermore, the value of b is increased by 1 (Step 2092). Subsequently, the operation returns to Step 203, and the measurement according to Steps 203 through 209 is performed for the view area 95 of a=1 under the vibration-giving condition of b=2.

As a result of the repetition of the measurement according to Steps 203 through 209 for the view area 95 of a=1, the value of b will eventually reach $b_{max}$ ("YES" in Step 2091). Then, the measurement for the view area 95 of a=1 is completed, and the operation proceeds to Step 210 to determine whether or not the value of a has reached $a_{max}$. If the value of a has not yet reached $a_{amx}$ ("NO" in Step 210), the direction of the clinched body 90 is changed by the rotary mechanism 124 in the previously described manner (Step 211), the view-area number a is increased by 1 (Step 212), and the operation returns to Step 2021. Subsequently, the operations of Steps 203 through 2093 are performed for the view area 95 having the new view-area number a. If the value of a has reached $a_{max}$ ("YES" in Step 210), the operation proceeds to Step 213.

In Step 213, the view-area number a is given an initial value of "1". Subsequently, in Step 2131, the vibration-giving condition b is given an initial value of "1". Subsequently, the distribution of the vibration state (amplitude and/or phase) at each point within the view area 95 having a view-area number of a=1 (vibration distribution) is determined in Steps 214 and 215 by the same method as in the previous embodiment.

Next, whether or not the value of b has reached $b_{max}$ is determined (Step 2151). In the present case, since b=1 and has not yet reached $b_{max}$ ("NO" in Step 2151), the value of b is increased by 1 (Step 2152), and the operations in Steps 214, 215 and 2151 are once more performed. When the value of b has reached $b_{max}$ (i.e. the determination result is "YES") in Step 2151, the operation proceeds to Step 2161, and whether or not the state of clinching within the view area 95 of a=1 is satisfactory is determined as will be hereinafter described.

If the state of clinching at the clinched portion 93 is satisfactory, the amplitude of the vibration at the clinched portion 93 normally becomes small in the vicinity of the clinched portion 93, since the tubular body 91 is bound by the clinch-target member 92. Accordingly, based on the obtained vibration distribution, whether or not the state of clinching at the clinched portion 93 is satisfactory can be determined by examining whether or not the amplitude of the vibration in the vicinity of the clinched portion 93 is small. However, if a standing wave is formed in the clinched body 95, a node of the standing wave may accidentally be located at the position of the clinched portion 93, causing the amplitude of the vibration to be smaller than the other portion. In such a situation, even when the actual state of clinching is imperfect, the state of clinching may be judged to be satisfactory if a single state of vibration is used as the basis for the judgment. To address this problem, in the present variation, a plurality of vibration-giving conditions are prepared for one view area 95, and the measurement of the vibration state is performed under each condition. When a node of the vibration is formed at the clinched portion 93 under all vibration-giving conditions, it is determined that the state of clinching is satisfactory.

After the determination on the state of clinching within one view area 95 is satisfactory has been completed in Step 2161, the operation proceeds to Step 217 to determine whether or not the value of a has reached $a_{max}$. If the value has not yet reached $a_{max}$ ("NO" in Step 217), the value of a is increased by 1 (Step 218), and the operations of Steps 214 through 2161 are performed to determine whether or not the state of clinching at the clinched portion 93 within the view area 95 having the next view-area number is satisfactory. If the value of a in Step 217 has reached $a_{max}$, the entire sequence of operations is discontinued.

Figure 13:
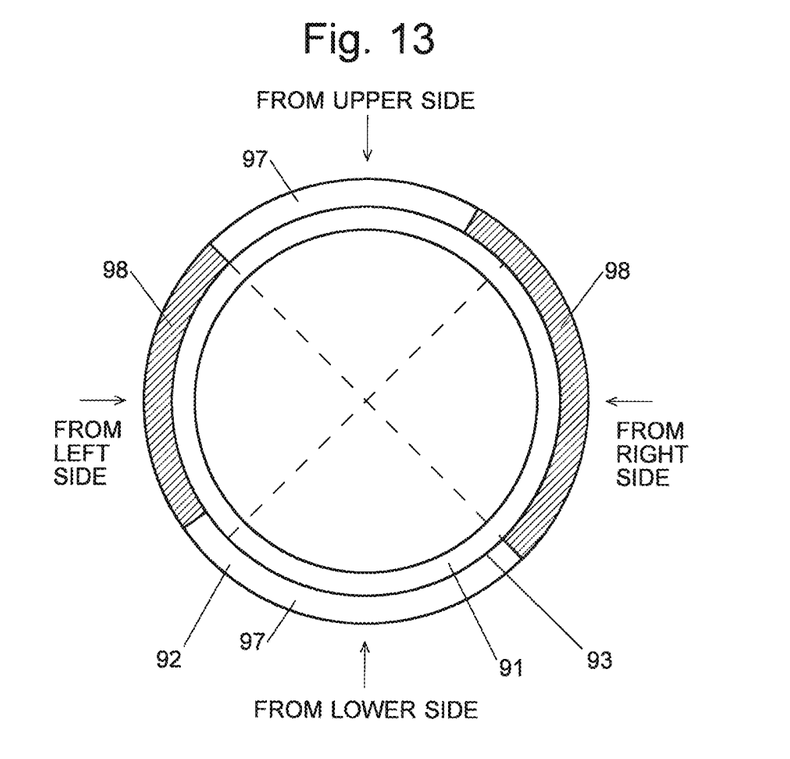
FIG. 13 is a model diagram showing a result obtained by carrying out an examination method according to the variation using an examination device according to the present embodiment, the image showing a section perpendicular to the longitudinal direction of the tubular body.

(4) Experimental Example of Examination of Clinched Portion by Examination Method According to Variation FIGS. 9-13 show an experimental example of the examination of the clinched portion 93 of the clinched body 90 using the examination method according to the variation. In this example, the number of view areas 95, i.e. $a_{max}$, is four. The vibration state was measured from four directions at right angles, i.e. from the upper, left, lower and right sides, as shown in FIG. 13 which is a sectional view at a plane perpendicular to the longitudinal direction of the tubular body 91. Five vibration-giving conditions ($b_{max}$=5) with different frequencies were used for each view area 95.

FIGS. 9-12 each show the distribution of the amplitude within one of the view areas 95 calculated by measuring the distribution of the amplitude of the standing wave (vibration distribution) under each of the five different vibration-giving conditions and averaging the five measured amplitudes. In those figures, higher average values are represented by brighter points. Accordingly, a point at which a node (with an amplitude of zero) of the standing wave was formed under all of the five vibration-giving conditions is represented by the darkest, black color. By comparison, a point at which a node of the standing wave was formed under some of the five vibration-giving conditions but not under the other conditions is not represented by the black color in FIGS. 9-12. Thus, the present method can prevent the situation in which the state of clinching at a position where a node of the standing wave has been accidentally formed is incorrectly judged as satisfactory despite the actual state of clinching being imperfect.

In FIGS. 9-12, reference sign 97 denotes the section of the clinched portion 93 within which bright points are noticeably located. Specifically, the bright points are distributed over a significant portion as viewed from above (FIG. 9), a small portion as viewed from the left (FIG. 10), and the entirety as viewed from below of the clinched portion 93 (FIG. 11), indicating that the state of clinching is imperfect at those portions. The points within the other sections of the clinched portion 93 are represented by the black color, which means that nodes of the standing wave are present at those points. This demonstrates that the state of clinching at those points are satisfactory.

The states of clinching obtained in FIGS. 9-12 are shown in FIG. 13. Reference signs 97 in FIG. 13 denote the sections at which the clinching is imperfect, while reference signs 98 denote the sections at which the clinching is satisfactory.

(5) Other Variations

The examination device and examination method according to the present embodiment, as well as one variation of the examination method have been described so far. The present invention is not limited to those examples. Two more variations will be hereinafter described. The present invention can be subjected to further modifications.

In the previously described variation, the measurement of the vibration state within one view area was individually performed under each of the plurality of vibration-giving conditions. Alternatively, the measurement of the vibration state may be performed only one time for each view area while giving a vibration containing a plurality of frequencies superposed on each other. The distribution of the vibration at each frequency can be determined at a later point in time by a frequency analysis. Although this method requires a more complex data analysis than the previously described variation, the period of time required for the measurement of the vibration state can be shortened.

In the examination device according to the previously described embodiment, a speckle interferometer may be used in place of the speckle-shearing interferometer 123 to measure the vibration distribution. In a speckle interferometer, a laser beam from a laser light source 121 is divided into illumination light and reference light. The illumination light is cast onto the view area 95 and is subsequently made to interfere with the reference light (which is not cast onto the view area 95). The intensity of the resulting interference light is acquired at each position within the view area 95. Other commonly known vibration measurement methods may also be used, such as the grating projection, sampling moire, digital image correlation, or laser Doppler method.

(6) Various Modes of Invention

Various modes of the present invention are hereinafter described.

A method for examining a clinched portion of a tubular body according to the first mode of the present invention includes the steps of: giving an elastic vibration to a clinched body formed by clinching a tubular body with a clinch-target member; and acquiring, for each of a plurality of view areas which differ from each other in the position in the circumferential direction of the tubular body, a vibration distribution optically and simultaneously measured within the view area including a clinched portion of the tubular body and the clinch-target member, to determine whether or not the state of clinching is satisfactory over the entire clinched portion.

In the method for examining a clinched portion of a tubular body according to the first mode, whether or not the state of clinching at the clinched portion within the view area is satisfactory can be determined, as will be described later, by optically and simultaneously measuring the vibration distribution within the view area including the clinched portion. By acquiring the vibration distribution for a plurality of view areas which differ from each other in the position in the circumferential direction of the tubular body, whether or not the state of clinching is satisfactory over the entire clinched portion can be determined.

If the tubular body and the clinch-target member are satisfactorily clinched, the amplitude of the vibration becomes small at the clinched portion, since the tubular body is bound by the clinch-target member. By comparison, if the tubular body and the clinch-target member are not satisfactorily clinched due to the presence of a micro-sized gap between those two members, the amplitude of the vibration becomes large at and around the clinched portion since the tubular body is not bound by the clinch-target member. Accordingly, based on the obtained vibration distribution, whether or not the state of clinching at the clinched portion is satisfactory can be determined by examining whether or not the amplitude of the vibration at the clinched portion is small. By such a method, imperfect clinching can be detected even if the gap between the tubular body and the clinch-target member is a micro-sized one. Furthermore, whether or not the state of clinching is satisfactory can be examined over the entire clinched portion by acquiring data at a plurality of view areas which differ from each other in the position in the circumferential direction of the tubular body. Thus, by the method for examining a clinched portion of a tubular body according to the first mode, imperfect clinching due to a micro-sized gap between the tubular body and the clinch-target member can be assuredly detected.

Various methods are available for measuring the vibration distribution within the view area, such as a speckle method, speckle-shearing method, grating projection, sampling moire, digital image correlation or laser Doppler method. The speckle method is a method in which irradiation light cast from a light source onto each point within a view area and reflected by that point is made to interfere with reference light branched from the irradiation light at a position between the light source and the view area, and the vibration distribution within the view area is determined from the interference pattern. The speckle-shearing method is a method in which irradiation light cast from a light source onto each point within a view area and reflected by that point is made to interfere with reference light which is the irradiation light reflected at another point in the vicinity of that point, and the vibration distribution within the view area is determined from the interference pattern. The speckle-shearing method may be modified so that the irradiation light cast from a light source onto each point within a view area and reflected by that point is made to interfere with reference light which is the irradiation light reflected by a number of points within an area in the vicinity of that point, and the vibration distribution within the view area is determined from the interference pattern.

A method for examining a clinched portion of a tubular body according to the second mode of the present invention is a specific form of the method for examining a clinched portion of a tubular body according to the first mode. In the second mode, in each of the plurality of view areas, a measurement of the vibration distribution is performed while each of a plurality of the elastic vibrations which differ from each other in either the position on the clinched body at which the vibration is given, or the frequency of the vibration, or both, is given to the clinched body, and it is determined that the state of clinching at the clinched portion within the view area is satisfactory if all of the plurality of kinds of measured vibration distributions have a node of the vibration at the clinched portion.

In the method for examining a clinched portion of a tubular body according to the second mode, if the clinched portion is satisfactory clinched, it is normally the case that the vibration given to the clinched body produces a standing wave having a node located at the clinched portion independently of the position or frequency of the vibration. Therefore, if all of the plurality of kinds of vibration distributions have a node of the vibration at the clinched portion, it is possible to conclude that the state of clinching is satisfactory. Since the presence of a node of a vibration is easier to recognize than the presence of the continuity of the vibration, the state of clinching can be more easily determined by the method according to the second mode. However, if the vibration distribution is determined from only one kind of vibration, a node of a standing wave may accidentally be located at the clinched portion regardless of whether or not the state of clinching is satisfactory. To address this problem, a vibration distribution is determined from each of the plurality of kinds of vibrations in the second mode.

In the case giving a plurality of different frequencies of vibrations to the clinched body in the second mode, the vibration distribution can be measured while giving the vibration to the clinched body at a different timing for each frequency. Alternatively, a vibration containing the plurality of frequencies superposed on each other may be simultaneously given, and the vibration distribution at each frequency may subsequently be determined by a frequency analysis. The former method is preferable in that the data analysis is easier than in the latter method, while the latter method is preferable in that the period of time required for the measurement can be shorter than in the former method.

A method for examining a clinched portion of a tubular body according to the third mode of the present invention is a specific form of the method for examining a clinched portion of a tubular body according to the first or second mode. In the third mode, the measurement of the vibration distribution is carried out by performing stroboscopic illumination of the view area and measuring the displacement in an out-of-plane direction of each point within the view area at three or more different phases of the vibration by controlling the timing of the elastic vibration and the stroboscopic illumination.

In the method for examining a clinched portion of a tubular body according to the third mode, the vibration distribution within the view area can be easily obtained by measuring the displacement in an out-of-plane direction of each point within the view area at three or more different phases of the vibration.

A device for examining a clinched portion of a tubular body according to the fourth mode of the present invention includes:

a vibration source configured to give an elastic vibration to a clinched body formed by clinching a tubular body with a clinch-target member; and a vibration distribution acquirer configured to acquire, for each of a plurality of view areas which differ from each other in the position in the circumferential direction of the tubular body, a vibration distribution optically and simultaneously measured within the view area including a clinched portion of the tubular body and the clinch-target member.

By the device for examining a clinched portion of a tubular body according to the fourth mode, as with the method for examining a clinched portion of a tubular body according to the first mode, imperfect clinching due to a micro-sized gap between the tubular body and the clinch-target member can be assuredly detected. The task of determining whether or not the state of clinching is satisfactory based on the vibration distribution acquired by the vibration distribution acquirer may be performed by an operator (person), or alternatively, by the configuration of the device for examining a clinched portion of a tubular body according to the fifth mode (which will be described below).

The device for examining a clinched portion of a tubular body according to the fifth mode of the present invention is a specific form of the device for examining a clinched portion of a tubular body according to the fourth mode. The device further includes:

a clinching-state determiner configured to determine, at each of the plurality of view areas, whether or not the state of clinching at the clinched portion within the view area is satisfactory based on the vibration distribution acquired by the vibration distribution acquirer.

By the device for examining a clinched portion of a tubular body according to the fifth mode, the task of determining whether or not the state of clinching is satisfactory is performed by the clinching-state determiner in place of an operator. Therefore, the operator can easily operate the device. The determination by the clinching-state determiner can be performed by a method similar to the method for examining a clinched portion of a tubular body according to any of the first through third modes.

The device for examining a clinched portion of a tubular body according to the sixth mode of the present invention is a specific form of the device for examining a clinched portion of a tubular body according to the fourth or fifth mode. The device further includes: an illuminator configured to perform stroboscopic illumination of the view area; and a displacement measurement section configured to measure the displacement in an out-of-plane direction of each point within the view area at three or more different phases of the vibration by controlling the timing of the elastic vibration and the stroboscopic illumination.

In the device for examining a clinched portion of a tubular body according to the sixth mode, the vibration distribution within the view area can be easily obtained by measuring the displacement in an out-of-plane direction of each point within the view area at three or more different phases of the vibration.

REFERENCE SIGNS LIST

10 . . . Examination Device (for Clinched Portion of Tubular Body)
11 . . . Vibration Source
111 . . . Signal Generator
112 . . . Vibrator
12 . . . Vibration Distribution Acquirer
121 . . . Laser Light Source
122 . . . Illumination Light Lens
123 . . . Speckle-Shearing Interferometer
1231 . . . Beam Splitter
1232 . . . First Reflector
1233 . . . Second Reflector
1234 . . . Phase Shifter
1235 . . . Converging Lens
1236 . . . Image Sensor
124 . . . Rotary Mechanism
125 . . . Vibration Distribution Determiner
13 . . . Clinching-State Determiner
14 . . . Display Unit
90 . . . Clinched body
91 . . . Tubular Body
911 . . . Tubular Body before Being Clinched with Clinch-Target Member
92 . . . Clinch-Target Member
921 . . . Hole in Clinch-target Member
93 . . . Clinched Portion
95 . . . View Area
96 . . . Coil
97 . . . Section with Imperfect Clinching
98 . . . Section with Satisfactory Clinching

The invention claimed is:

1. A method for examining a clinched portion of a tubular body, comprising steps of: giving an elastic vibration to a clinched body formed by clinching a tubular body with a clinch-target member while the clinched body is in contact with a vibration source; and acquiring, for each of a plurality of view areas which differ from each other in a position in a circumferential direction of the tubular body, a vibration distribution optically and simultaneously measured within the view area including a clinched portion of the tubular body and the clinch-target member, to determine whether or not a state of clinching is satisfactory over the entire clinched portion.

2. The method for examining a boded portion of a tubular body according to claim 1, wherein, in each of the plurality of view areas, a measurement of the vibration distribution is performed while each of a plurality of the elastic vibrations which differ from each other in either a position on the clinched body at which the vibration is given, or a frequency of the vibration, or both, is given to the clinched body, and it is determined that the state of clinching at the clinched portion within the view area is satisfactory if all of the plurality of kinds of measured vibration distributions have a node of the vibration at the clinched portion.

3. The method for examining a boded portion of a tubular body according to claim 1, wherein the measurement of the vibration distribution is carried out by performing stroboscopic illumination of the view area and measuring a displacement in an out-of-plane direction of each point within the view area at three or more different phases of the vibration by controlling a timing of the elastic vibration and the stroboscopic illumination.

4. A device for examining a clinched portion of a tubular body, comprising:

a vibration source configured to give an elastic vibration to a clinched body formed by clinching a tubular body with a clinch-target member while the clinched body is in contact with the vibration source; and a vibration distribution acquirer configured to acquire, for each of a plurality of view areas which differ from each other in a position in a circumferential direction of the tubular body, a vibration distribution optically and simultaneously measured within the view area including a clinched portion of the tubular body and the clinch-target member.

5. The device for examining a clinched portion of a tubular body according to claim 4, further comprising:

a clinching-state determiner configured to determine, at each of the plurality of view areas, whether or not a state of clinching at the clinched portion within the view area is satisfactory based on the vibration distribution acquired by the vibration distribution acquirer.

6. The device for examining a clinched portion of a tubular body according to claim 4, further comprising:

an illuminator configured to perform stroboscopic illumination of the view area; and a displacement measurement section configured to measure a displacement in an out-of-plane direction of each point within the view area at three or more different phases of the vibration by controlling a timing of the elastic vibration and the stroboscopic illumination.

7. The method for examining a boded portion of a tubular body according to claim 2, wherein the measurement of the vibration distribution is carried out by performing stroboscopic illumination of the view area and measuring a displacement in an out-of-plane direction of each point within the view area at three or more different phases of the vibration by controlling a timing of the elastic vibration and the stroboscopic illumination.

8. The device for examining a clinched portion of a tubular body according to claim 5, further comprising:

an illuminator configured to perform stroboscopic illumination of the view area; and a displacement measurement section configured to measure a displacement in an out-of-plane direction of each point within the view area at three or more different phases of the vibration by controlling a timing of the elastic vibration and the stroboscopic illumination.

* * * * *